(12) United States Patent
Raciborski et al.

(10) Patent No.: US 7,961,625 B2
(45) Date of Patent: Jun. 14, 2011

(54) ROUTING UNDER HEAVY LOADING

(75) Inventors: Nathan F. Raciborski, Phoenix, AZ (US); Michael M. Gordon, Paradise Valley, AZ (US)

(73) Assignee: Limelight Networks, Inc., Tempe, AZ (US)

( * ) Notice: Subject to any disclaimer, the term of this patent is extended or adjusted under 35 U.S.C. 154(b) by 445 days.

(21) Appl. No.: 11/461,173

(22) Filed: Jul. 31, 2006

(65) Prior Publication Data

US 2007/0025254 A1 Feb. 1, 2007

Related U.S. Application Data

(63) Continuation-in-part of application No. 11/195,247, filed on Aug. 1, 2005.

(60) Provisional application No. 60/761,582, filed on Jan. 23, 2006.

(51) Int. Cl.
*H04J 1/16* (2006.01)
*H04L 12/28* (2006.01)

(52) U.S. Cl. .................................. 370/237; 370/392

(58) Field of Classification Search .................. 370/389, 370/392, 230
See application file for complete search history.

(56) References Cited

U.S. PATENT DOCUMENTS

| | | | | |
|---|---|---|---|---|
| 5,805,809 A * | 9/1998 | Singh et al. | | 709/203 |
| 6,108,703 A | 8/2000 | Leighton et al. | | |
| 6,584,074 B1 * | 6/2003 | Vasamsetti et al. | | 370/254 |
| 6,775,235 B2 * | 8/2004 | Datta et al. | | 370/238 |
| 6,775,280 B1 * | 8/2004 | Ma et al. | | 370/392 |
| 6,785,704 B1 | 8/2004 | McCanne | | |
| 7,035,923 B1 * | 4/2006 | Yoakum et al. | | 709/224 |
| 7,222,190 B2 * | 5/2007 | Klinker et al. | | 709/238 |
| 7,269,157 B2 * | 9/2007 | Klinker et al. | | 370/351 |
| 7,274,658 B2 | 9/2007 | Bornstein et al. | | |
| 7,349,994 B2 | 3/2008 | Balonado et al. | | |
| 2002/0143798 A1 | 10/2002 | Lisiecki et al. | | |
| 2002/0163882 A1 | 11/2002 | Bornstein et al. | | |

(Continued)

OTHER PUBLICATIONS

U.S. Appl. No. 11/195,247, Advisory Action dated May 7, 2009, 3 pages.

(Continued)

*Primary Examiner* — Melanie Jagannathan
(74) *Attorney, Agent, or Firm* — Kilpatrick Townsend and Stockton LLP

(57) ABSTRACT

According to the invention, a delivery network for assisting delivery of content objects over an Internet is disclosed. The delivery network includes a network outlet, an interface and a routing function. The network outlet is coupled to a plurality of full-route networks, where each of the plurality of full-route networks is capable of delivering content objects to a plurality of terminal networks. The plurality of terminal networks include a terminal network, where the plurality of terminal networks are coupled to a plurality of end user computers. The interface receives content objects for delivery to the plurality of end user computers. The routing function routes content objects in at least two modes, where a first mode routes content objects based upon a first route path from the network outlet to the terminal network, and a second mode routes at least some content objects using a second route path from the network outlet to the terminal network. The first route path is chosen based upon delivery efficiency. Switching from the first mode to the second mode is triggered when at least of a portion of the first route path reaches a predetermined level of use. The first and second route paths are different, and the second route path is less efficient than the first route path.

22 Claims, 13 Drawing Sheets

U.S. PATENT DOCUMENTS

| | | |
|---|---|---|
| 2003/0086422 A1 | 5/2003 | Klinker et al. |
| 2003/0135644 A1 | 7/2003 | Barrett |
| 2004/1114569 | 6/2004 | Naden et al. |
| 2005/0010653 A1 | 1/2005 | McCanne |
| 2005/0071469 A1 | 3/2005 | McCollom et al. |
| 2005/0147081 A1 | 7/2005 | Acharya et al. |
| 2006/0176900 A1* | 8/2006 | Liu et al. .................. 370/465 |
| 2006/0182034 A1 | 8/2006 | Klinker et al. |

OTHER PUBLICATIONS

U.S. Appl. No. 11/195,247, Office Action dated Jun. 8, 2009, 34 pages.
U.S. Appl. No. 11/195,247, Office Action dated Jul. 16, 2008, 33 pages.
U.S. Appl. No. 11/195,247, Final Office Action dated Jan. 28, 2009, 33 pages.

* cited by examiner

ROUTING UNDER HEAVY LOADING

This application claims the benefit of and is a non-provisional of U.S. Provisional Application Ser. No. 60/761,582 filed on Jan. 23, 2006 and is continuation-in-part of U.S. patent application Ser. No. 11/195,247, filed on Aug. 1, 2005, which are both assigned to the assigner hereof and hereby expressly incorporated by reference in their entirety for all purposes.

BACKGROUND

This disclosure relates in general to content delivery and, more specifically, but not by way of limitation, to content delivery under load.

Content originators provide content objects to recipients over the Internet. The Internet is an amalgamation of various networks who pass each other's network traffic such that recipients can receive their content objects. The various networks can be divided into Tier 1 and terminal networks. All Tier 1 networks are full-route networks such that any point on the Internet can be reached by the Tier 1 network by using terminal networks and other full-route networks. Each recipient has Internet service from a terminal network, and content originators may use a combination of Tier 1 and terminal networks to deliver their content objects. The various networks, content originators and recipients pay in some way for delivering content objects using Tier 1 networks.

A content delivery network (CDN) is used by many content originators to deliver content more efficiently. The CDN may host, mirror or cache the content as well as deliver it to a requesting party. A web site or origin server is linked to the CDN such that some or all content can be sourced from the CDN rather than the content originator directly. CDNs also use Tier 1 networks and may have peering relationships with terminal networks. This process of fulfilling a link through a CDN is usually transparent to the recipient.

Today, there are about 10-15 Tier 1 networks worldwide. Some can pass 50-150 GB/min. to various destinations on the Internet. To accomplish this, Tier 1 networks pass content objects to terminal networks and peer with other Tier 1 networks. Peer Tier 1 networks agree to pass content objects from other Tier 1 networks destined to their terminal networks without cost. Tier 1 networks generally charge content providers and terminal networks for passing content objects such that peering relationships are generally avoided in these circumstances.

Peered Tier 1 networks agree to pass each other traffic only when the terminal network is not connected to the Tier 1 network receiving the traffic initially, but the other peered Tier 1 network has a connection to that terminal network. If a Tier 1 network receives a content object destined for a terminal network not directly connected to the Tier 1 network, it is passed to a peer Tier 1 network with a connection to that terminal network under the peering agreement.

Where a particular Tier 1 network has a connection to a terminal network, a content object destined for that terminal network cannot be passed to a peer Tier 1 network who may also have a connection to the terminal network. If the interconnect to the terminal network is overwhelmed, the content object may be lost. Interconnects between Tier 1 peers and terminal networks are expensive and tend to be over-built to accommodate worst-case demand.

Single casting of large events can be difficult for CDNs or Tier 1 networks to deliver effectively. Large events require content objects (e.g., files or streams) to tens of thousands of recipients in a short period of time. Egress from the CDN and/or Tier 1 networks can be overwhelmed by these large events. These egress points have finite bandwidth that serve as a bottleneck for large events. To avoid these bottlenecks, CDNs and Tier 1 networks overbuild their egress points in anticipation of the loading. In some cases today, large events cannot be served by any CDN or Tier 1 network without overloading parts of their networks. For example, a news site reporting a major and unexpected news event can find that their delivery system cannot keep up with a sudden spike in demand.

BRIEF DESCRIPTION OF THE DRAWINGS

The present disclosure is described in conjunction with the appended figures.

Figure 1A:
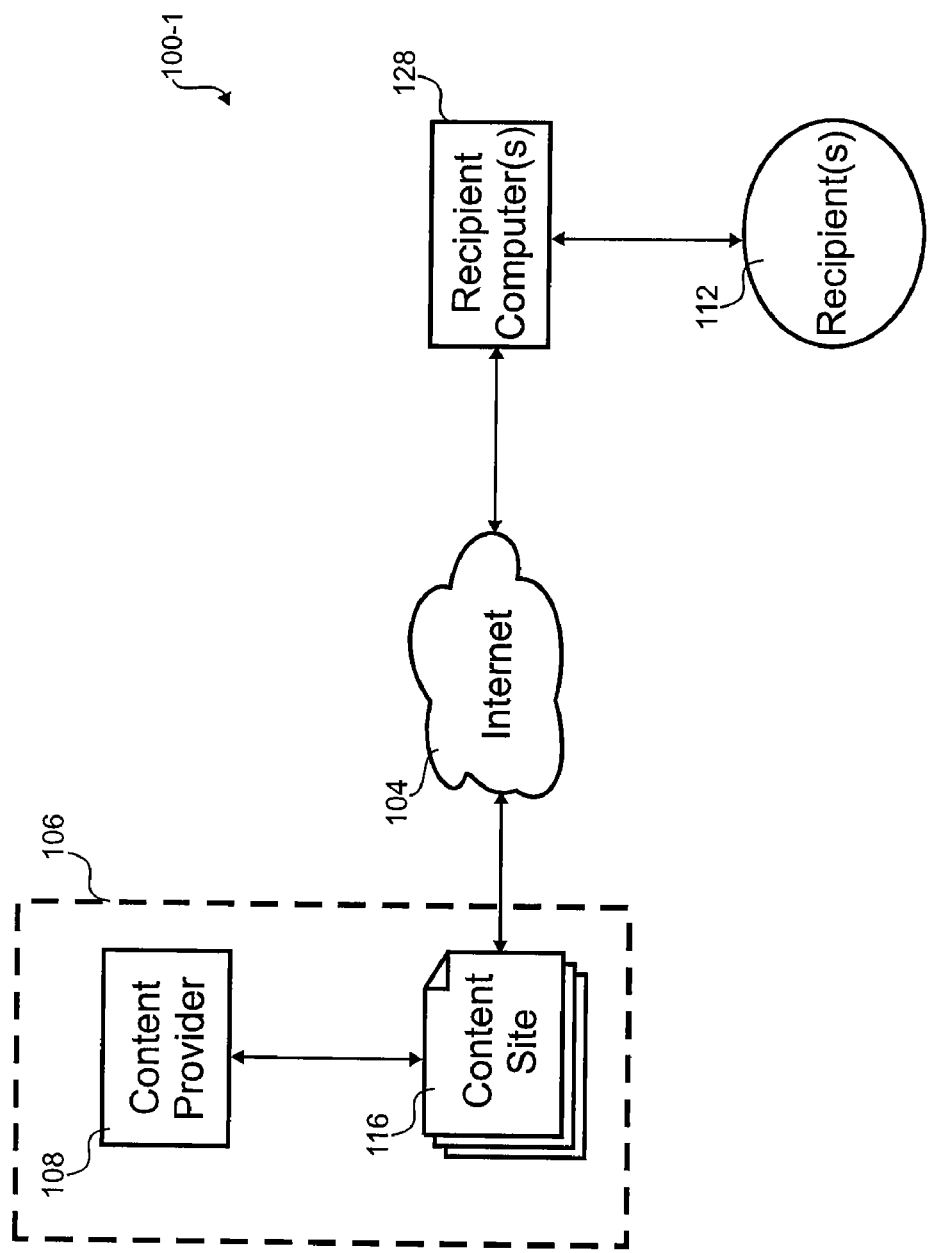
FIGS. 1A-1B are block diagrams of embodiments of a content system.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE PREFERRED EMBODIMENT

The ensuing description provides preferred exemplary embodiment(s) only, and is not intended to limit the scope, applicability or configuration of the invention. Rather, the ensuing description of the preferred exemplary embodiment(s) will provide those skilled in the art with an enabling description for implementing a preferred exemplary embodiment of the invention. It being understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "computer-readable medium" includes, but is not limited to portable or fixed storage devices, optical storage devices, wireless channels and various other mediums capable of storing, containing or carrying instruction(s) and/or data.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

With reference to FIG. 1A, an embodiment of a content system 100-1 is shown. The content originator 106 produces content objects. Included in the content originator 106 are a content provider 108 and a content origin site or web site 116. A content object is any content file or content stream and could include, for example, software, audio, video, pictures, data, and/or text. The content object could be live, delayed or stored. The content site 116 can be located within the infrastructure of the content provider 108 and/or at an alternative location. Throughout the specification, reference may be made to a content object, content stream and/or content file, but it is to be understood that those terms could be used interchangeably wherever they may appear.

The content originator 106 is the source or re-distributor of content objects. The content site 116 is an Internet site accessible directly or indirectly via the Internet 104 by the recipient computer 128. Content objects from the content provider 108 are made available to recipients 112 through the content site 116. In one embodiment, the content site 116 could be a web site where the content is viewable with a web browser. In other embodiments, the content site 116 could be accessible with application software other than a web browser and/or accessible from devices other than personal computers. In some cases, recipient computers 128 can act as content originators 106 and content originators 106 can act as recipient computers 128.

The recipient computer 128 receives the content object and processes it for the recipient 112. The recipient computer 128 could be a personal computer, media player, handheld computer, Internet appliance set top box, phone, or any other device that can receive content objects. In some cases, the recipient computer 128 can be a number of computing devices that may be networked together.

Each recipient computer or other device 128 is associated with an Internet service provider (ISP) or terminal network. The ISP is part of the Internet 104 in FIG. 1A. Each ISP provides Internet connectivity to one or more recipient computers or other devices 128. A recipient computer or other device 128 requests and accepts the content objects for realization to the recipient 112. The ISP works with other networks of the Internet 104 to deliver content between the content originator 106 and the recipient computer 128.

Figure 1B:
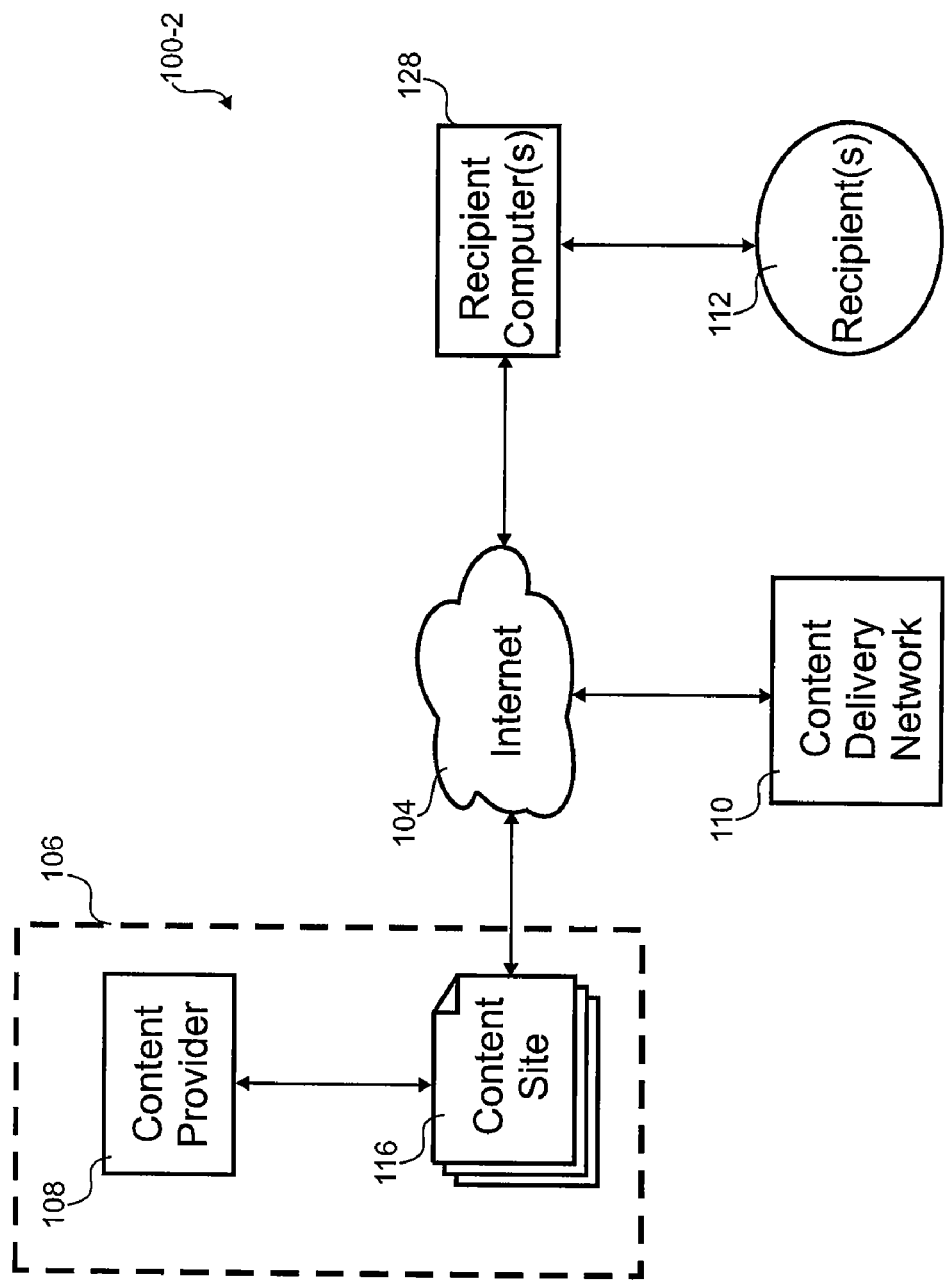

With reference to FIG. 1B, an embodiment of a content system 100 is shown where a content originator 106 offloads the delivery of the content objects to a content delivery network (CDN) 110. The CDN 110 is used to offload some or all content object deliveries from the content originator 106. Embodiments can use multiple CDNs 110 or could have a CDN 110 integral to the content originator 106. The content site 116 can be located within the infrastructure of the content provider 108, within a CDN 110 and/or at an alternative location.

Many content providers 108 use a CDN 110 to deliver the content objects to customers or recipients. When a content object is requested by a recipient, the CDN 110 retrieves the content object from the content provider 108. Alternatively, the content provider 108 may directly provide the content object to the CDN 110, i.e., in advance of the first request. The CDN 110 then provides the content object to the recipient 112. The content provider 108 typically pays the CDN 110 for the delivery of the content object. In other embodiments, the CDN 110 could be captive or associated with the content provider 108 such that payment is not performed. Links on the content site 116 and/or links to individual content objects are structured to allow delivery through one or more CDNs 110. The links may be rewritten before a web page is rendered or after a link is activated by using a redirect, for example.

Figure 2A:
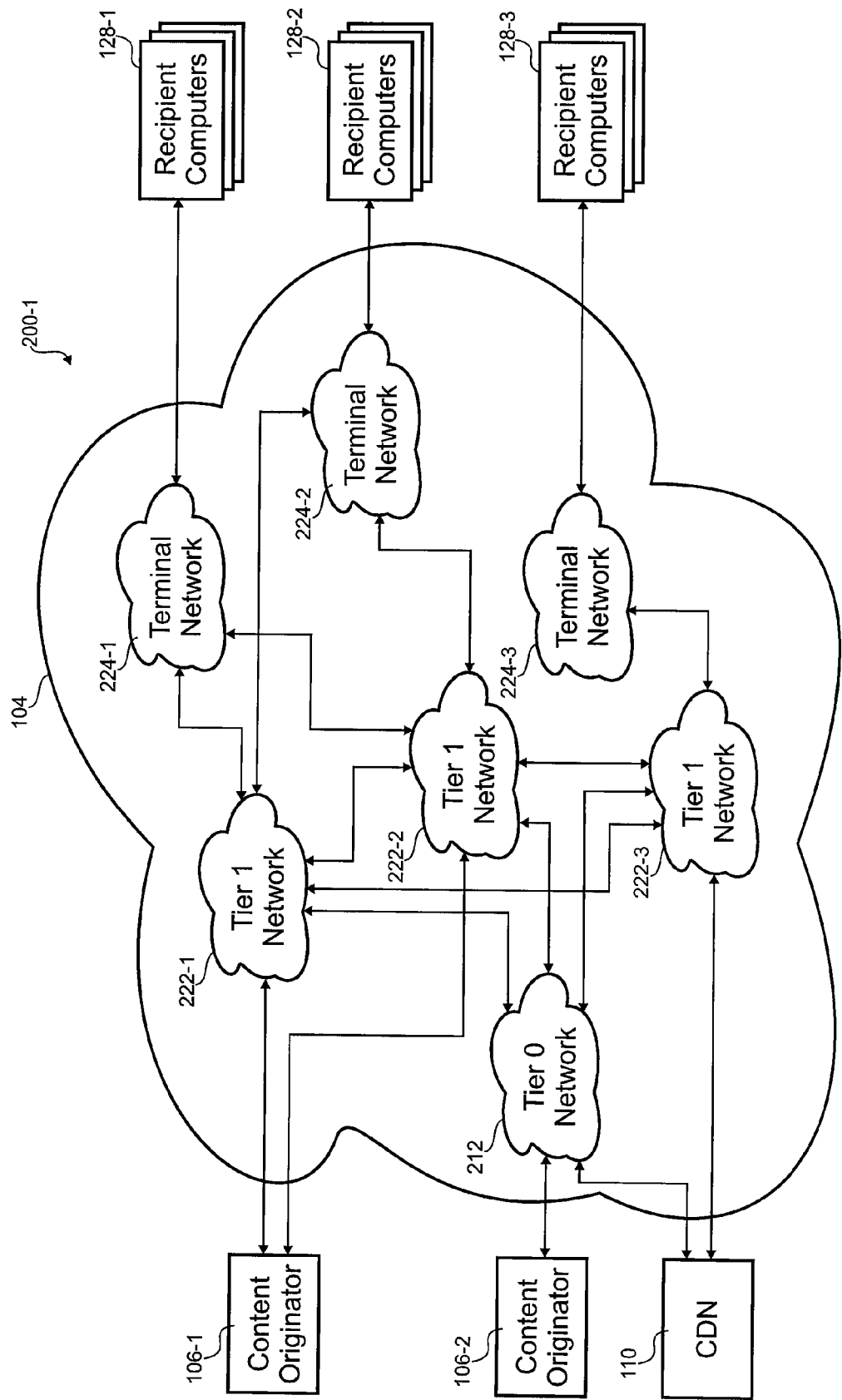
FIGS. 2A-2D are block diagrams of embodiments of the content system that exposes routing details of the Internet.

With reference to FIG. 2A, a block diagram of an embodiment of a content system 200-1 is shown that exposes routing details of the Internet 104. This embodiment shows the complex relationships between various networks 212, 222, 224 that make up the Internet 104. Many other interconnection configurations are possible and this embodiment is simplified in that the many of connections and networks are not depicted for clarity.

Recipient computers 128 get their Internet access through a terminal network 224. The last network involved in the delivery to the recipient computer 128 is the terminal network 224. Terminal networks 224 are commonly called Internet service providers (ISPs). Generally, content originators 106 pass content objects to the recipient computers 128 using the Internet 104, which ultimately includes a terminal network 224.

The Internet 104 is largely a group of networks 212, 222, 224 that agree to carry each-others network traffic for free (e.g., a peer relationship) or some fee. These networks 212, 222, 224 include Tier 1 or full-route networks 222, Tier 0 networks 212 that use multiple full-route networks and terminal networks 224. Interconnects between the various networks 212, 222, 224 could be implemented with packet switched or circuit switched connections that are generally bandwidth controlled or limited. For example, the first content originator 106-1 could have a 10 MB/min. connection a first Tier 1 network 222-1. Over utilized interconnects generally suffer poor QoS that could include slow speeds and/or lost packets.

Tier 1 networks 222 are networks that typically charge to receive or send content objects from CDNs 110, terminal networks 224 and content originators 106. Tier 1 networks 222 are full-route networks in that any Internet protocol (IP)

address is reachable from any Tier 1 network 222. Terminal networks 224 use the full-route ability of the Tier 1 networks 222 to provide full-route service to the recipient computers 128 who subscribe with the terminal network 224 for Internet service. Conversely, content originators 106 and CDNs use the full-route service to deliver content to any IP address.

The CDN 110 and content originators 106 may have different arrangements with the various networks 212, 222, 224 that make up the Internet 104. Because of these differing arrangements, the delivering costs to each CDN 110 could vary for a particular recipient 112 or route chosen to the recipient 112. In this embodiment, the CDN 110 has two egress points, namely, a first egress point goes to a first Tier 0 network 212 and a second egress point goes to a third Tier 1 network 222-3. Because of the CDN's 110 relationship with the Tier 0 network 212 and the third Tier 1 network 222-3, either can be used by the CDN 110 to deliver content objects. The first content originator 106-1 has arrangements with a first and second Tier 1 networks 222-1, 222-2 for communication with the Internet and delivery of content objects. The second content originator 106-2 uses the Tier 0 network 212 for communication and delivery.

Each Tier 1 network 222 can route to all the terminal networks 224, but the efficiency to a particular end point would vary for each Tier 1 network 222. All Tier 1 networks generally have peering relationships with other Tier 1 networks, but a first Tier 1 network 222-1 cannot pass traffic to another Tier 1 network 222-2 where the first Tier 1 network 222-1 has egress to the terminal network 224 associated with the target recipient computer 128 for the traffic. For example, when the second Tier 1 network 222-2 receives a content object for delivery to the third terminal network 224-3, the content object can be passed to the first or third Tier 1 networks 222-1, 222-3 for delivery because the second Tier 1 network 222-2 has no direct egress to the third terminal network 224-3. In another example, the first Tier 1 network 222-1 may receive a content object for delivery to the second terminal network 224-2, but has to try to deliver the content object to the second terminal network 224-2 even if the interconnect to between the two is loaded so as to provide inadequate QoS.

The Tier 0 network 212 generally has interconnects with at least two Tier 1 networks 222. In this embodiment, the Tier 0 network 212 has interconnects with three Tier 1 networks 222. The Tier 0 network 212 could also have interconnects to various terminal networks 224 in other embodiments. Both content originators 106 and CDNs 110 may use the Tier 0 network 212 for delivery instead of a Tier 1 network 222 or terminal network 224. In some cases, a Tier 1 network 222 could even use the Tier 0 network 212 for delivery. For example, the second Tier 1 network 222-2 may have a content object for the second terminal network 224-2, but the second Tier 1 network 222-2 determines that its interconnect to the second terminal network 224-2 would provide inadequate QoS. The second Tier 1 network 222-2 could pass the content object to the Tier 0 network 212 for delivery by the Tier 0 network 212 using the first or third terminal networks 224-1, 224-3.

The Tier 0 network 212 can route in at least two modes. In a first mode, the Tier 0 network 212 routes with the three Tier 1 networks using efficiency to guide the routing. Efficient routing is typically based upon the number of hops and the speed of the routers between those hops. For example, the efficient or optimal paths may be chosen based upon latency or other conventional techniques. The first mode corresponds to conventional routing methods.

At some point, one of the efficient interconnects may become utilized beyond a threshold, which can trigger routing in the second mode. The Tier 0 network 212 can communicate traffic using any of the three connected Tier 1 networks 222. If one interconnect gets loaded beyond a threshold, the other interconnects can be used even if not optimal. Since any of the Tier 1 networks 222 is full route, giving a content object to a sub-optimal Tier 1 network 222 for delivery will still result in delivery to the recipient computer 128 even if at a lower QoS. A sub-optimal route is defined as one that is less efficient under light load conditions and would not be chosen by conventional algorithms that base decisions on efficiency.

Switching between routing modes is demonstrated in the following example. The interconnect between the Tier 0 network 212 and the third Tier 1 network 222-3 may be capable of 50 MB/min., for example. The most efficient path to recipient computers 128-3 of the third terminal network 224-3 uses the third Tier 1 network 222-3 in this embodiment. When the interconnect between the Tier 0 network 212 and the third Tier 1 network 222-3 reaches 40 MB/min. utilization threshold, for example, the second routing method could be initiated. The Tier 0 network 212 in the second routing mode could start routing to recipient computers 128-3 of the third terminal network 224-3 using the first and second Tier 1 networks 222-1, 222-2 even though they are less efficient routes to the third terminal network 224-3 under normal circumstances.

Routing in the second mode can be done in a number of ways. In one embodiment, all routing is done in a random or mixed-up manner. When any one interconnect reaches a threshold, all future content objects are delivered to Tier 1 networks 222 chosen in a manner that doesn't take into account routing optimization as was done in the first mode. The interconnects could be randomly used, assigned in a sequential fashion, assigned to the lowest utilized interconnect or some other non-optimal routing method. Generally, the Tier 0 network 212 switches to sub-optimal routing under heavy loads where that sub-optimal routing assures that any bottleneck to the optimal Tier 1 networks 222 is avoided as long as possible. Once utilization falls below a second threshold, the Tier 0 network 212 can resume routing with the first routing mode once again.

Figure 2B:
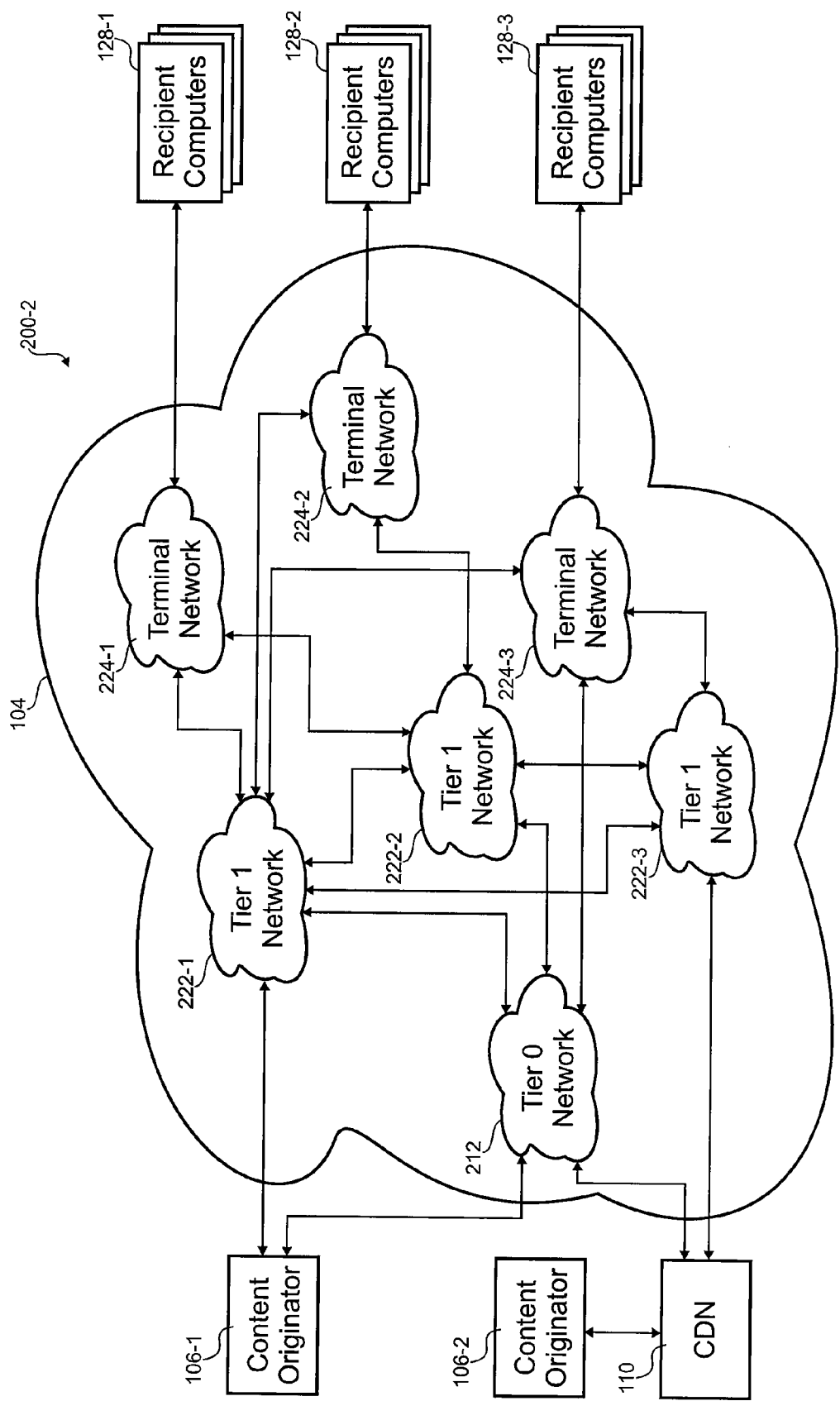

Referring next to FIG. 2B, a block diagram of another embodiment of a content system 200-2 is shown that exposes routing details of the Internet 104. In this embodiment, the Tier 0 network 212 has interconnections to two Tier 1 networks 222-1, 222-2 and one terminal network 224-3. The terminal network 224-3 receives connectivity from the first Tier 1 network 222-1, the second Tier 1 network 222-2 and the Tier 0 network 212. The third terminal network 224-3 may pay the Tier 0 network 212 for connectivity. When the Tier 0 network 212 is routing to the third terminal network 224-3, routing in the first mode would use a direct interconnect between the Tier 0 network 212 and the terminal network 224-3. Switching to the second mode of routing would use the first and second Tier 1 networks 222-1, 222-2 as additional routes to the third group of recipient computers 128-3.

A Tier 1 network 222 may arrange with the Tier 0 network 212 to deliver content in one embodiment. For example, where the first Tier 1 network 222-1 receives a content object for delivery through the first terminal network 224, the first Tier 1 network 222-1 may be determine its interconnect to the first Tier 1 network 222-1 is over-utilized. The first Tier 1 network 222-1 could hand-off the content object delivery to the Tier 0 network 212 who could pass it to the second Tier 1 network 222-2, for example, for delivery. The Tier 0 network 212 may charge for this ability or could net the charge against the charges for using the first Tier 1 network 222-1 to deliver other content objects.

Figure 2C:
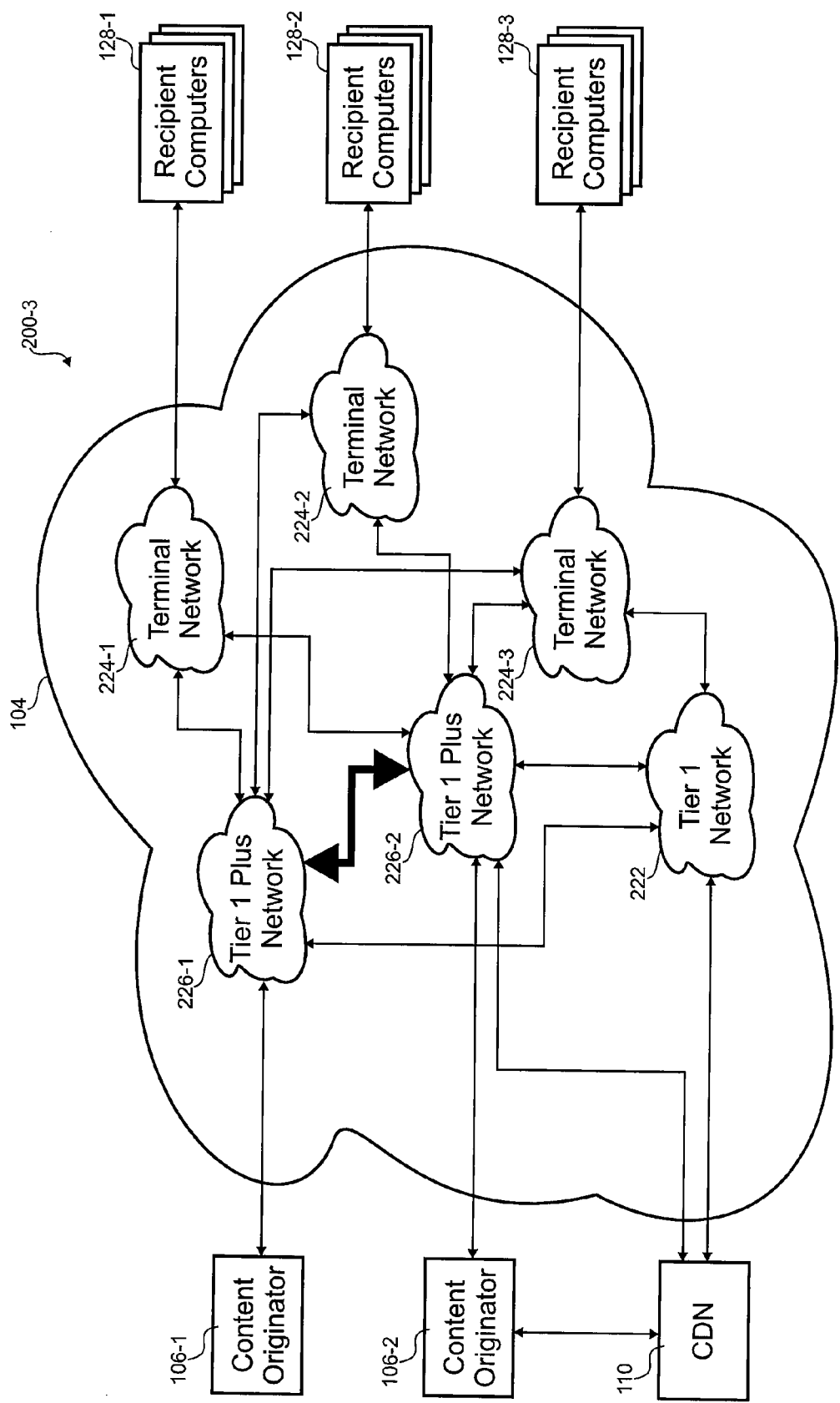

Referring next to FIG. 2C, a block diagram of yet another embodiment of a content system 200-3 is shown that exposes routing details of the Internet 104. In this embodiment, there is no Tier 0 network, but Tier 1 plus networks 226 allow routing in the second mode with other Tier 1 plus networks 226. Tier 1 networks 222 do not route traffic destined for terminal networks that they have an interconnection to, but a Tier 1 plus network 226 would do that routing if the connection between the Tier 1 plus network 226 and the terminal network 224 were loaded beyond a threshold.

The differences between a Tier 1 plus network 226 and a Tier 1 network 222 can be demonstrated by an example. In this example, the CDN 110 receives a content object destined for the third group of recipient computers 128-3 by way of the third terminal network. Should the CDN 110 choose to send the content object using the Tier 1 network 222, any bottleneck between the Tier 1 network 222 and the terminal network 224-3 could affect QoS. Alternatively, the CDN 110 could use the second Tier 1 plus network 226-2. Should the connection between the second Tier 1 plus network 226-2 and the third terminal network 224-3 come utilized beyond some threshold and/or QoS begin to suffer, the second Tier 1 plus network 226-2 could pass the content object to the first Tier 1 plus network 226-1 to utilize the connection between the first Tier 1 plus network 226-1 and third terminal network 224-3.

Figure 2D:
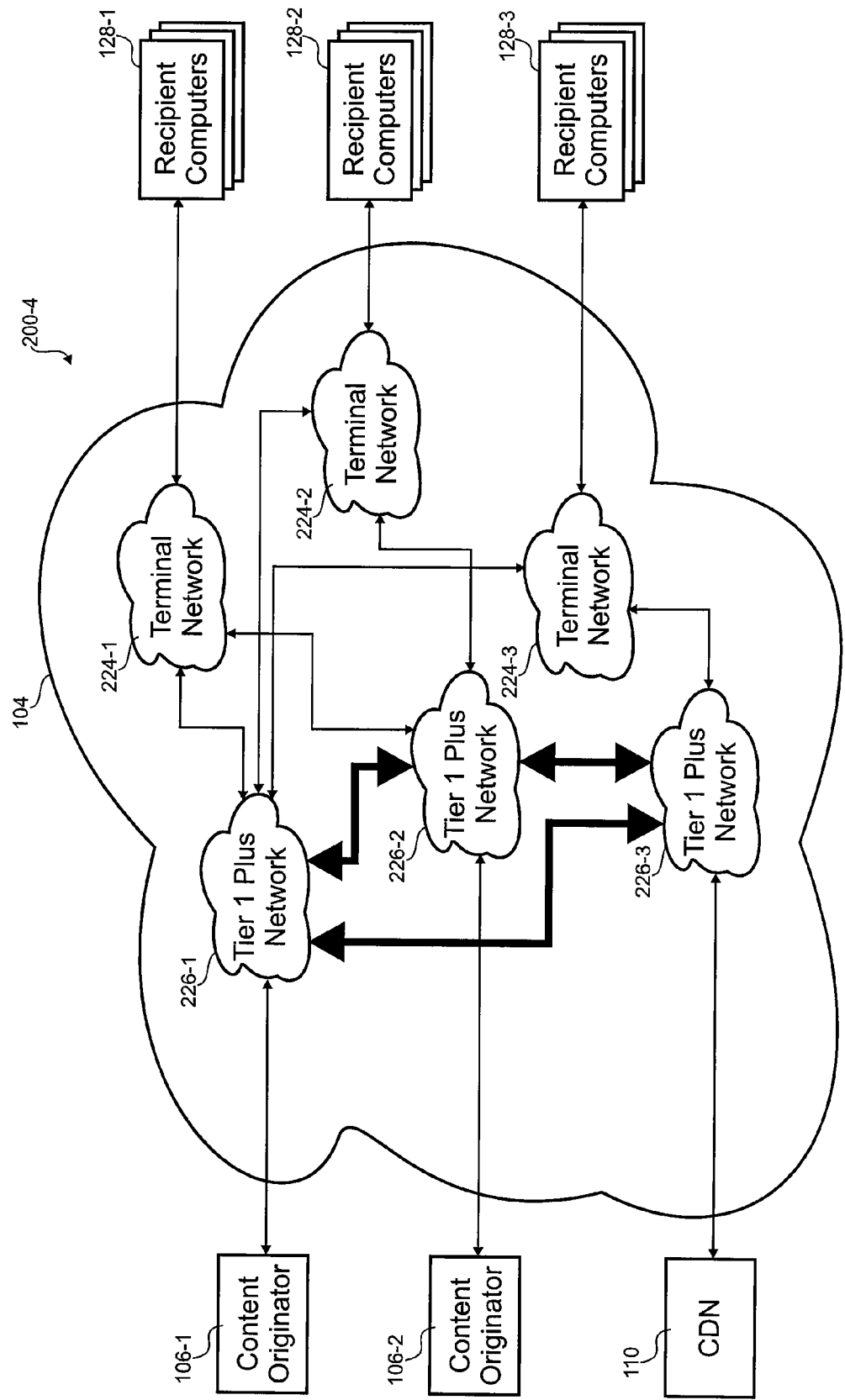

Referring next to FIG. 2D, a block diagram of still another embodiment of a content system 200-4 is shown that exposes routing details of the Internet 104. In this embodiment, there are no Tier 1 networks depicted such that all are Tier 1 plus networks 226. Any CDN 110 or content originator 106 need only have a connection with a single Tier 1 plus network 226 in this embodiment. So long as the connection to the Tier 1 plus network 226 isn't overwhelmed, there is likely to be adequate QoS for other parts of the Internet 104.

Figure 3:
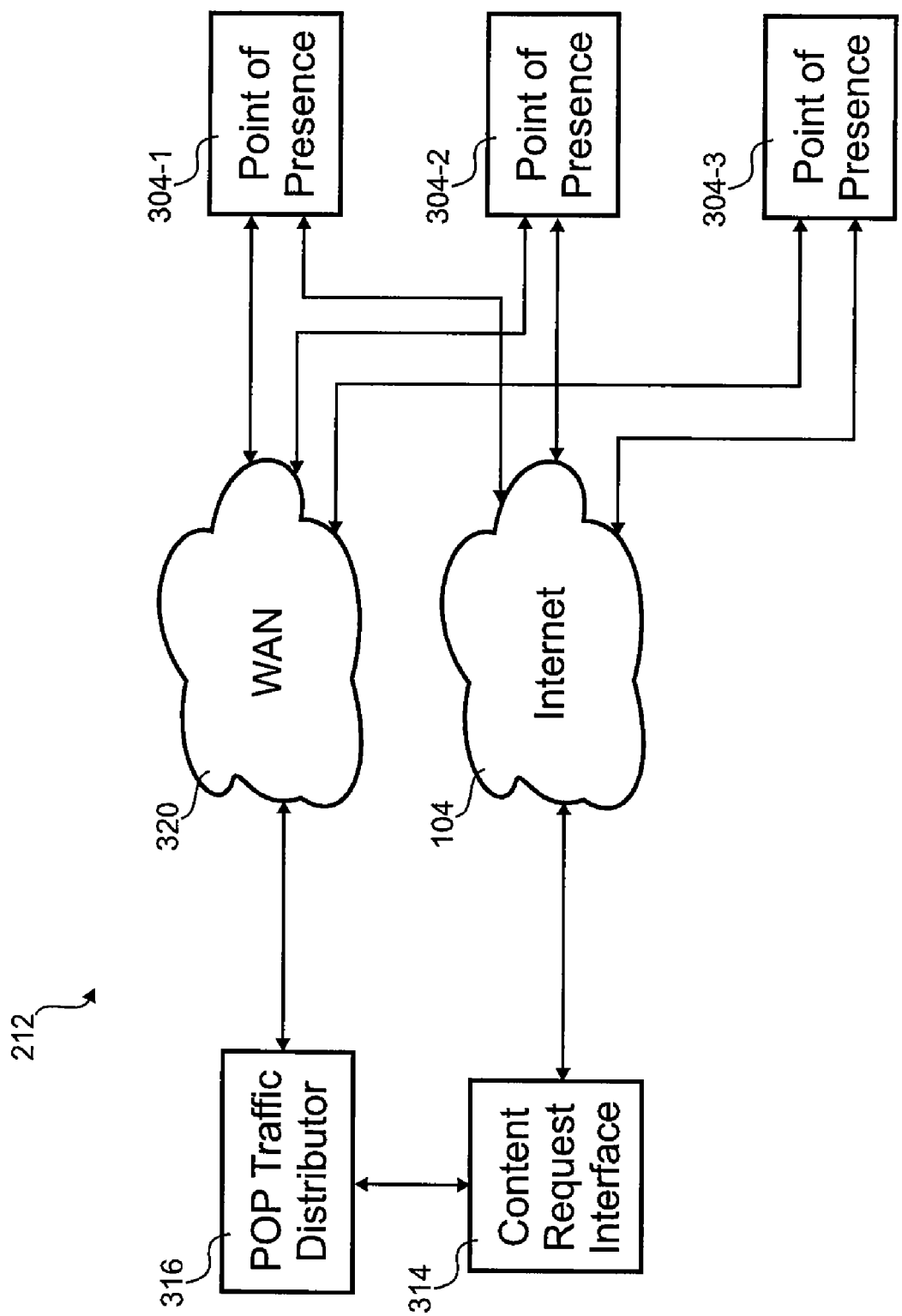
FIG. 3 is a block diagram of an embodiment of Tier 0 network.

With reference to FIG. 3, a block diagram of an embodiment of a Tier 0 network 212 is shown. This embodiment has a central POP traffic distributor 316 and content request interface 314 coupled by a WAN 320 or other backbone to a number of remote POPs 304. Various embodiments could have any number of POPs 304 geographically distributed to deliver content. Each POP 304 has connections with other networks 222, 224, 226 to communicate with recipient computers 128.

There can be multiple interconnects between a Tier 0 network 212 and other networks 222, 224, 226. Multiple connections may be dispersed among the multiple POPs 304. For example, the Tier 0 network 212 may connect to a Tier 1 network 222 in POPs 304 in Chicago and Miami, but not in a POP 304 in Los Angeles. Where there are multiple interconnections, the Tier 0 network can treat them separately or collectively when operating in the first and second routing modes. For example, when the Chicago interconnect with a Tier 1 network 222 becomes utilized beyond a threshold, the Miami connection to the same Tier 1 network 222 could be used in mode two routing along with connections to other Tier 1 networks 222.

Routing decisions are made in a POP traffic distributor 316 and/or in the POP 304. In one embodiment, the POP traffic distributor 316 chooses the POP 304 and the POP 304 chooses the egress point. In another embodiment, the POP traffic distributor 316 makes all the routing decisions within the CDN 110. Other embodiments could directly have the POPs 304 decide independently if they will deliver the content object or pass the delivery off to another POP 304.

The POP traffic distributor 316 receives requests for content objects through a content request interface 314 and distributes those requests to a POP 304 best suited to service the request. The "best suited" POP may be different when routing in mode one or mode two. Communication between the POP traffic distributor 316 and the POPs takes place over a WAN backbone 320 (e.g., leased line, a private network and/or the Internet 104). In alternative embodiments, the WAN backbone 320 could be replaced with a tunneled connection over the Internet 104 or a traditional Internet connection.

In this embodiment, there are three POPs 304 that serve requests for content. The POPs 304 each have connections to various Tier 1 networks 222, 226 and terminal networks 224 to serve various recipient computers 128. Different POPs 304 could communicate with different networks. The POP traffic distributor 316 is aware of the communication options for each POP 304 along with the terminal network 220, 224 associated with a particular recipient computer 128. So long as a particular POP 304 and/or connection is not utilized beyond a threshold, the POP traffic distributor 316 will include that POP 304 as a possible choice for delivering a particular content object. Once the content object request is associated with a particular POP 304, it is served or streamed from that POP 304. That is to say that a particular content object is not divided among multiple POPs 304 for delivery in this embodiment.

Figure 4A:
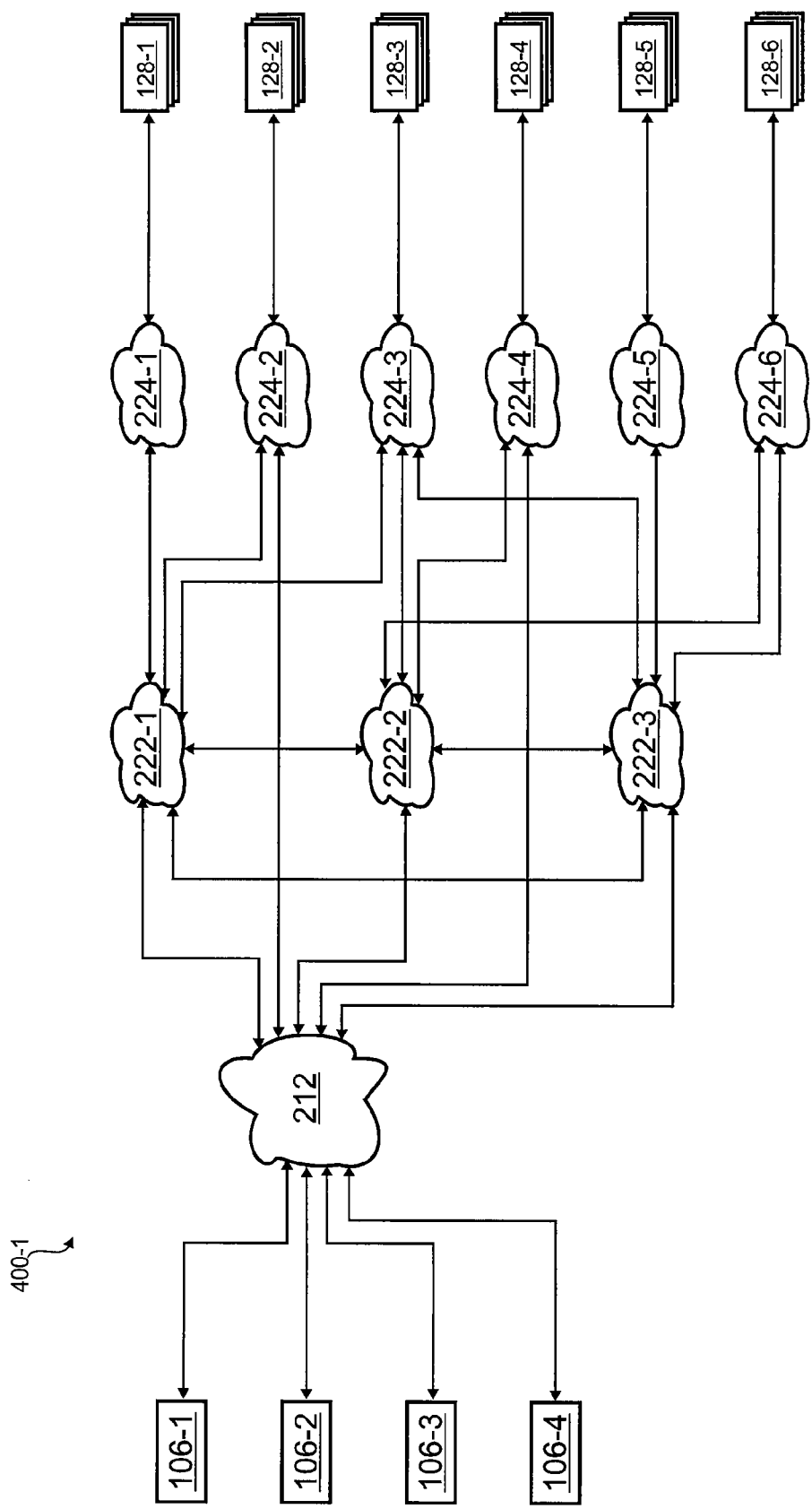
FIGS. 4A-4C are block diagrams of embodiments of a portion of the content system that shows interaction of networks in a particular geographic region.

Referring next to FIG. 4A, a block diagram of an embodiment of a portion 400-1 of the content system 100 is shown that shows interaction of networks in a particular geographic region. This embodiment could have additional geographic regions with additional and redundant connections between networks, but the simplified embodiment shown in this figure only illustrates networks in a particular geographic region. Multiple content originators 106 are coupled to a Tier 0 network 212. In one POP, the Tier 0 network 212 is interconnected with three Tier 1 networks 222 and a terminal network 224-4. The connection between from Tier 0 network 212 to the terminal network 224 may be preferred over use of any of the Tier 1 networks 222 as the fourth terminal network 224 pays for delivered content in this embodiment.

The various routing paths are shown in Table I for this embodiment. The hops correspond to a routing operation between two interconnects for use in routing between the content originator 106 and a recipient group. Each extra hop generally increases latency and increases the risk of reaching a bottleneck. In routing to the first recipient group 128-1, for example, one route has three hops and the other routes have four hops. Routing in the first mode may be based upon minimizing hops, but should the connection between the Tier 0 network 212 and the first Tier 1 network 222-1 become utilized beyond a threshold routing could switch to a second mode. In the second mode, all three routes could be used in round-robin or random fashion such that all future delivery streams are divided among all possible paths. Alternatively, the second mode could remove the over-utilized route(s) and use the remaining routes until utilization decreases for the excluded routes.

TABLE I

Routing Possibilities to the Groups of Recipient Computers

| Recipient Group | Various Routes |
| --- | --- |
| 128-1 | 106-x, 212, 222-1, 224-1, 128-1 |
|  | 106-x, 212, 222-2, 222-1, 224-1, 128-1 |
|  | 106-x, 212, 222-3, 222-1, 224-1, 128-1 |

TABLE I-continued

Routing Possibilities to the Groups of Recipient Computers

| Recipient Group | Various Routes |
|---|---|
| 128-2 | 106-x, 212, 224-2, 128-2 |
|  | 106-x, 212, 222-1, 224-2, 128-2 |
|  | 106-x, 212, 222-2, 222-1, 224-2, 128-2 |
|  | 106-x, 212, 222-3, 222-1, 224-2, 128-2 |
| 128-3 | 106-x, 212, 222-1, 224-3, 128-3 |
|  | 106-x, 212, 222-2, 224-3, 128-3 |
|  | 106-x, 212, 222-3, 224-3, 128-3 |
| 128-4 | 106-x, 212, 224-4, 128-4 |
|  | 106-x, 212, 222-2, 224-4, 128-4 |
|  | 106-x, 212, 222-1, 222-2, 224-4, 128-4 |
|  | 106-x, 212, 222-3, 222-2, 224-4, 128-4 |
| 128-5 | 106-x, 212, 222-3, 224-5, 128-5 |
|  | 106-x, 212, 222-1, 222-3, 224-5, 128-5 |
|  | 106-x, 212, 222-2, 222-3, 224-5, 128-5 |
| 128-6 | 106-x, 212, 222-2, 224-6, 128-6 |
|  | 106-x, 212, 222-3, 224-6, 128-6 |
|  | 106-x, 212, 222-1, 222-2, 224-6, 128-6 |
|  | 106-x, 212, 222-1, 222-3, 224-6, 128-6 |

Figure 4B:
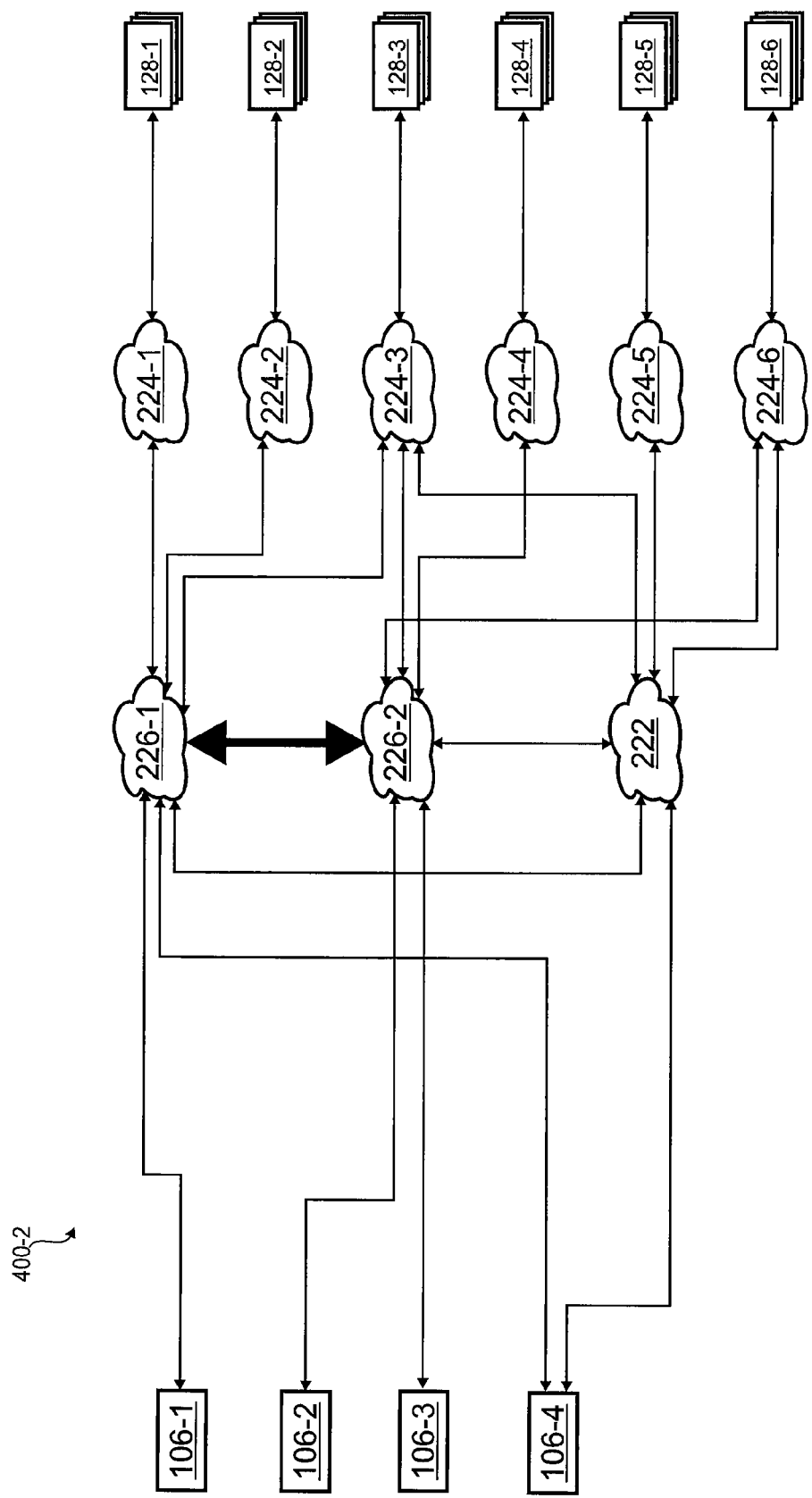

With reference to FIG. 4B, a block diagram of an embodiment of a portion 400-2 of the content system 100 is shown that shows interaction of networks in a particular geographic region. This embodiment has two Tier 1 plus networks 226 and one Tier 1 network 222 in this geographic region used by the terminal networks 224-1 and content originator 106. Table II shows the various routing options available. The interlink between the two Tier 1 plus networks can be used even where the Tier 1 plus network has a direct connection with the target terminal network 224. Table II shows in italics where Tier 1 plus networks 226 are taking advantage of the interlink in the second mode of routing.

Tier 1 plus networks 226 may account for traffic consumed in the second mode of routing. This traffic could be charged for in a manner beyond the peering agreement. For example, the first Tier 1 plus network 226-1 could be charged for passing traffic to the second Tier 1 plus network 226-2 that is destined for the third terminal network 224-3. Conversely, the second Tier 1 plus network 226-2 could be charged for passing traffic to the first Tier 1 plus network 226-1 that is destined for the third terminal network 224-3. In one embodiment, the various charges could be netted together to partially cancel some before payments are made periodically.

In this embodiment, the Tier 1 plus or Tier 1 networks 222, 226 only pass traffic to another Tier 1 plus or Tier 1 network 222, 226 when the receiving network 222, 226 has a connection to the target network 224. Other embodiments could allow passing traffic regardless of whether there is a connection. For example, the following route between the first content originator 106-1 and the fifth group of recipient computers 128-5 is possible: 106-1, 226-1, 226-2, 222, 224-5, 128-5. Movement of traffic in this way could only be done when the second routing mode is triggered for one embodiment.

TABLE II

Routing Possibilities to the Groups of Recipient Computers

| Recipient Group | Various Routes |
|---|---|
| 128-1 | 106-1, 226-1, 224-1, 128-1 |
|  | 106-2, 226-2, 226-1, 224-1, 128-1 |
|  | 106-3, 226-2, 226-1, 224-1, 128-1 |
|  | 106-4, 222, 226-1, 224-1, 128-1 |
|  | 106-4, 226-1, 224-1, 128-1 |
| 128-2 | 106-1, 226-1, 224-2, 128-2 |
|  | 106-2, 226-2, 226-1, 224-2, 128-2 |
|  | 106-3, 226-2, 226-1, 224-2, 128-2 |
|  | 106-4, 226-1, 224-2, 128-2 |
|  | 106-4, 222, 226-1, 224-2, 128-2 |
| 128-3 | 106-1, 226-1, 224-3, 128-3 |
|  | *106-1, 226-1, 226-2, 224-3, 128-3* |
|  | 106-2, 226-2, 224-3, 128-3 |
|  | *106-2, 226-2, 226-1, 224-3, 128-3* |
|  | 106-3, 226-2, 224-3, 128-3 |
|  | *106-3, 226-2, 226-1, 224-3, 128-3* |
|  | 106-4, 226-1, 224-3, 128-3 |
|  | *106-4, 226-1, 226-2, 224-3, 128-3* |
|  | 106-4, 222, 224-3, 128-3 |
| 128-4 | 106-1, 226-1, 226-2, 224-4, 128-4 |
|  | 106-2, 226-2, 224-4, 128-4 |
|  | 106-3, 226-2, 224-4, 128-4 |
|  | 106-4, 226-1, 226-2, 224-4, 128-4 |
|  | 106-4, 222, 226-2, 224-4, 128-4 |
| 128-5 | 106-1, 226-1, 222, 224-5, 128-5 |
|  | 106-2, 226-2, 222, 224-5, 128-5 |
|  | 106-3, 226-2, 222, 224-5, 128-5 |
|  | 106-4, 226-1, 222, 224-5, 128-5 |
|  | 106-4, 222, 224-5, 128-5 |
| 128-6 | 106-1, 226-1, 226-2, 224-6, 128-6 |
|  | 106-1, 226-1, 222, 224-6, 128-6 |
|  | 106-2, 226-2, 224-6, 128-6 |
|  | 106-3, 226-2, 224-6, 128-6 |
|  | 106-4, 226-1, 226-2, 224-6, 128-6 |
|  | 106-4, 226-1, 222, 224-6, 128-6 |
|  | 106-4, 222, 224-6, 128-6 |

Figure 4C:
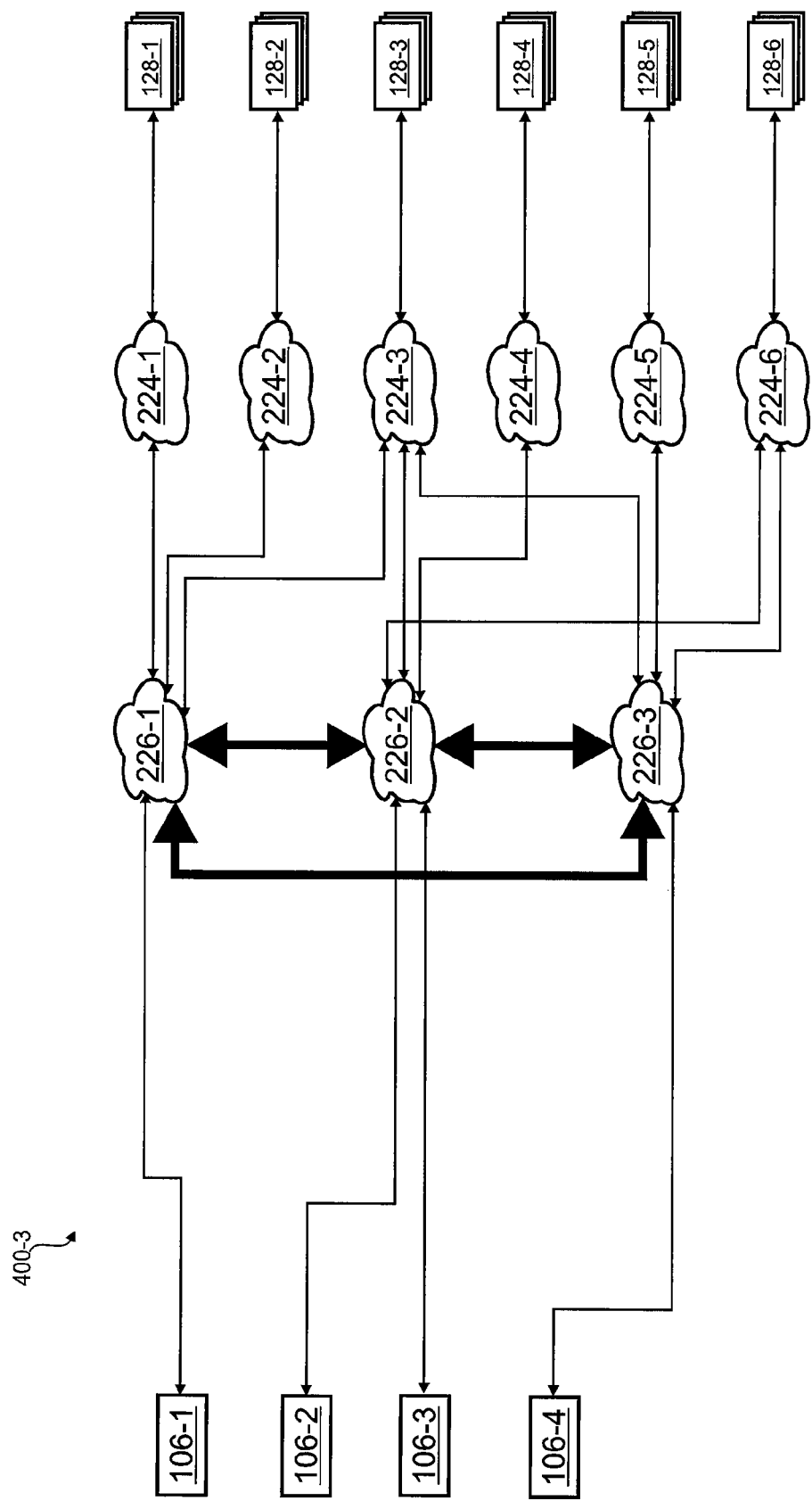

Referring next to FIG. 4C, a block diagram of an embodiment of a portion 400-3 of the content system 100 is shown that shows interaction of networks in a particular geographic region. In this embodiment, there are three Tier 1 plus networks 226 used for delivering content in this geographic region. Table III shows routing available for the various groups of recipient computers 128. The routes shown in italics are made available by using Tier 1 plus networks 226 instead of convention Tier 1 networks 222.

TABLE III

Routing Possibilities to the Groups of Recipient Computers

| Recipient Group | Various Routes |
|---|---|
| 128-1 | 106-1, 226-1, 224-1, 128-1 |
|  | 106-2, 226-2, 226-1, 224-1, 128-1 |
|  | 106-3, 226-2, 226-1, 224-1, 128-1 |
|  | 106-4, 226-3, 226-1, 224-1, 128-1 |
| 128-2 | 106-1, 226-1, 224-2, 128-2 |
|  | 106-2, 226-2, 226-1, 224-2, 128-2 |
|  | 106-3, 226-2, 226-1, 224-2, 128-2 |
|  | 106-4, 226-3, 226-1, 224-2, 128-2 |
| 128-3 | 106-1, 226-1, 224-3, 128-3 |
|  | *106-1, 226-1, 226-2, 224-3, 128-3* |
|  | *106-1, 226-1, 226-3, 224-3, 128-3* |
|  | 106-2, 226-2, 224-3, 128-3 |
|  | *106-2, 226-2, 226-1, 224-3, 128-3* |
|  | *106-2, 226-2, 226-3, 224-3, 128-3* |
|  | 106-3, 226-2, 224-3, 128-3 |
|  | *106-3, 226-2, 226-1, 224-3, 128-3* |
|  | *106-3, 226-2, 226-3, 224-3, 128-3* |
|  | 106-4, 226-3, 224-3, 128-3 |
|  | *106-4, 226-3, 226-2, 224-3, 128-3* |
|  | *106-4, 226-3, 226-3, 224-3, 128-3* |
| 128-4 | 106-1, 226-1, 226-2, 224-4, 128-4 |
|  | 106-2, 226-2, 224-4, 128-4 |
|  | 106-3, 226-2, 224-4, 128-4 |
|  | 106-4, 226-3, 226-2, 224-4, 128-4 |
| 128-5 | 106-1, 226-1, 226-3, 224-5, 128-5 |
|  | 106-2, 226-2, 226-3, 224-5, 128-5 |

TABLE III-continued

Routing Possibilities to the Groups of Recipient Computers

| Recipient Group | Various Routes |
|---|---|
|  | 106-3, 226-2, 226-3, 224-5, 128-5 |
|  | 106-4, 226-3, 224-5, 128-5 |
| 128-6 | 106-1, 226-1, 226-2, 224-6, 128-6 |
|  | 106-1, 226-1, 226-3, 224-6, 128-6 |
|  | 106-2, 226-2, 224-6, 128-6 |
|  | *106-2, 226-2, 226-3, 224-6, 128-6* |
|  | 106-3, 226-2, 224-6, 128-6 |
|  | *106-3, 226-2, 226-3, 224-6, 128-6* |
|  | 106-4, 226-3, 224-6, 128-6 |
|  | *106-4, 226-3, 226-2, 224-6, 128-6* |

Figure 5A:
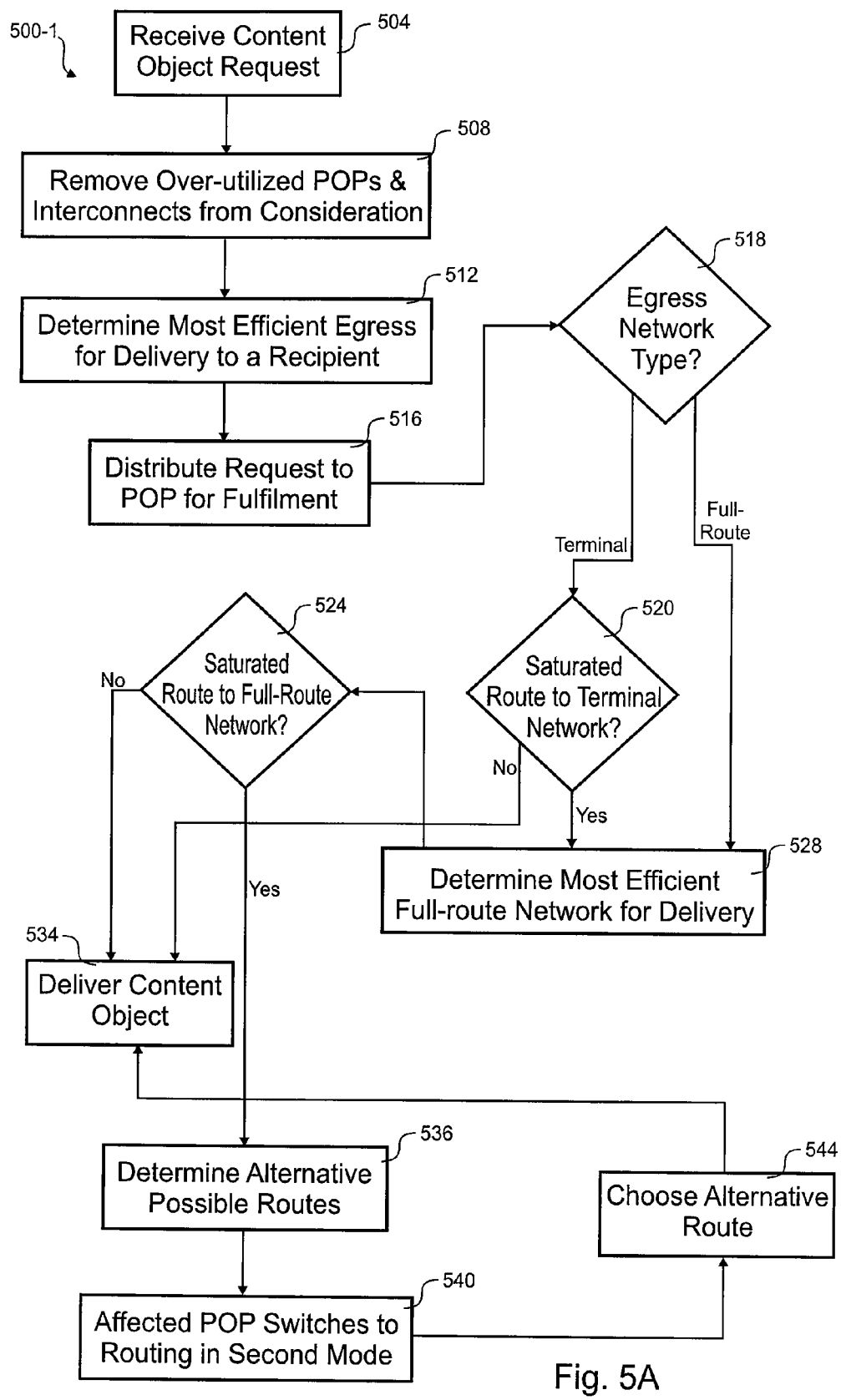
FIGS. 5A-C are flow diagrams of embodiment of a process for delivering content that switches between routing methods.

With reference to FIG. 5A, a flow diagram of an embodiment of a process 500-1 for delivering content is shown that switches between routing methods. The depicted portion of the process begins in step 504 where a content object request is received by the Tier 0 network 212 or Tier 1 plus network 226. This could be in the form of a uniform resource identifier (URI) or uniform resource locator (URL) that indicates the content object desired. The Tier 0 network 212 or Tier 1 plus network 226 can determine an IP address of the requesting computer 128 from the protocol level handshake to pass the URI. The IP address corresponds to a terminal network 224 and a general geographic region. From this information, peering relationships, POP geographical locations and interconnect points, are analyzed to determine the possible POPs 304 to use.

In step 508, any POPs 304 and interconnect points utilized over threshold can be removed from consideration. A saturated POP may be completely saturated at all interconnect points or partially saturated at the interconnect to the relevant peering network 222, 226 or terminal network 224. For example, routing to the sixth group of recipient computers 128-6 resulting in possible routes given in Table I below for two geographically diverse POPs 304. In this example, the recipient computer 128-6 is located in Phoenix, Ariz. The first POP 304-1 is near Tucson, Ariz. and corresponds to FIG. 4A, and the second POP 304-2 is near New York, N.Y. and corresponds to FIG. 4C. The sixth terminal network 224-6 can pass traffic between different geographic regions such that traffic received in New York, N.Y. could be passed to a recipient computer 128-6 in Tucson, Ariz. or elsewhere.

In this embodiment, the threshold for over-utilization is set at 80%. Since the all routes of the first POP 304-1 to the recipient computer 128-6 are saturated beyond the threshold, the first POP 304-1 would be removed from consideration although geographically closer to the recipient computer 128-6. This embodiment only considers utilization of bandwidth, but other embodiments consider utilization of other resources that could affect QoS. For example, if 90% of processing resources are active, the POP could be removed from consideration.

TABLE IV

Routing Possibilities to Fourth Group of Recipient Computers

| POP(s) | Possible Routes | Saturation |
|---|---|---|
| 304-1 in Tucson, AZ | 106-x, 212, 222-2, 224-6, 128-6 | 90% |
|  | 106-x, 212, 222-3, 224-6, 128-6 | 85% |
|  | 106-x, 212, 222-1, 222-2, 224-6, 128-6 | 92% |
|  | 106-x, 212, 222-1, 222-3, 224-6, 128-6 | 87% |
| 304-2 in New York, NY | 106-1, 226-1, 226-2, 224-6, 128-6 | 95% |
|  | 106-1, 226-1, 226-3, 224-6, 128-6 | 35% |
| | 106-2, 226-2, 224-6, 128-6 | 91% |
| | *106-2, 226-2, 226-3, 224-6, 128-6* | 92% |
| | 106-3, 226-2, 224-6, 128-6 | 94% |
| | *106-3, 226-2, 226-3, 224-6, 128-6* | 33% |
| | 106-4, 226-3, 224-6, 128-6 | 30% |
| | *106-4, 226-3, 226-2, 224-6, 128-6* | 94% |

In step 512, the most efficient egress point is determined. In this example, the second POP 304-2 is the only remaining POP 304 under consideration, but in other embodiments many more POPs could be available such that interconnects from multiple POPs are considered. In this example, the third content originator 106-3 is the source of the content object being delivered to the sixth recipient computer 128-6. There are two routing possibilities between the third content originator 106-3 and the second POP 304-2, but one has two hops and the other has three. In this embodiment, the more efficient routes are those with the fewest hops, but other embodiments could determine efficiency in other ways. The request for the content object is passed to the second POP 304-2 in step 516. Some embodiments have lower cost routes such as terminal networks 224. For example, the Tier 0 network 212 in FIG. 2B can route to both Tier 1 networks 222 or terminal networks 224-3, but the terminal network 224-3 is likely to be lower or no cost. This embodiment tries to route to the lower cost networks in steps 518 and 520, before using full-route networks (e.g., Tier 1 and Tier 1 plus networks 222, 226) in step 528, which are typically more expensive. The decision in step 518 passes the request to a terminal network 224 in step 520 where there is a peering relationship or lower-cost network, for example, or to a full-route network in step 528 if there is no terminal network 224. Where there is no network with a cost advantage, the request is passed from step 518 to step 528 to choose the most efficient full-route network for delivery. In this embodiment, once delivery starts with a particular route, delivery continues on that route until the stream or file delivery is completed.

For step 520, a saturation threshold is set at some number. Initially, saturation is determined by figuring how much of the bandwidth of the interconnect is consumed in one embodiment. If packet loss increases beyond some level, saturation would be found even if the egress point bandwidth is not completely consumed as packet loss is an indicator that there is another bandwidth bottle neck between the egress point and the destination computer 128. Where the terminal network 224 is determined to be saturated, processing goes to step 528 to find a full-route network route instead of step 534 to deliver the content object with the terminal network 224.

Where the peer network connection is saturated as determined in step 520, an alternative full-route Tier 1 or Tier 1 plus network 222, 226 would be found in step 528. In this example, the 106-3 to 226-2 to 224-6 to 128-6 is found to be the most efficient as it has the least hops. The affected POP 304-1 would switch to delivering all new traffic for the sixth group of recipient computers 128-6 to this path until the saturation level of the first POP 304-1 decreases.

The chosen route is checked for saturation in step 524 by checking for over-utilization from the second Tier 1 plus network 226-2. Other embodiments could check the whole path to find bottlenecks anywhere in the route. The saturation determination is a function of both theoretical bandwidth of the egress point and/or packet loss. Excessive use of the bandwidth or observed packet loss would result in a determination in step 524 that the interconnection between the Tier 1 plus network 226-2 and the sixth terminal network 224-6 is over-utilized. In this embodiment, the utilization threshold is 90% and the 106-3 to 226-2 to 224-6 to 128-6 route is utilized to 94%. Were there utilization below the threshold, processing would pass from step 524 to step 534 for delivery of the content object.

Where the interconnection between the Tier 1 plus network 226-2 and the sixth terminal network 224-6 is over-utilized as shown in the example of Table IV, the content object would be delivered by some other route if available. In step 536, a list of alternative routes is determined and routing switches to the second mode in step 540. In this example, the route of 106-3 to 226-2 to 226-3 to 224-6 to 128-6 is an alternative that uses three hops instead of the more efficient two hop and over-utilized route.

The traffic that would be routed to the over-utilized route is diverted to the less efficient, but less utilized route in the second routing mode in step 544. Where there are a number of alternatives, content objects can be divided between them in random or mixed-up fashion so as to generally distribute the loading. There are many different possible algorithms to choose other routes in step 544. These algorithms generally distribute traffic across various networks 222, 224, 226 in one or more POPs 304 so long as other routes are not also saturated. For example, a first overflow request could be served by a first POP 304 and the next overflow request could be served by a second POP 304.

Some embodiments only route overflow to other Tier 1 or Tier 1 plus networks 222, 226 associated with the POP 304 where the saturation occurred instead of considering other POPs 304. Some algorithms could weight the attractiveness of a route according to utilization, cost and/or efficiency. None of these algorithms is based solely upon efficiency as the most efficient network 222, 224, 226 is already saturated. A first routing mode takes all the unsaturated routes and determines the most efficient one or more. After over-utilized, the future content object requests are distributed randomly or sequentially across all routes of the same cost. Where there are several cost levels, one algorithm weights the attractiveness of a route according to the relative cost. Another algorithm distributes requests according to saturation level such that the least saturated are favored over the more saturated. Yet another algorithm takes all routes and distributes traffic among them. Once the alternative route is chosen in step 544, the request is fulfilled in step 534.

Figure 5B:
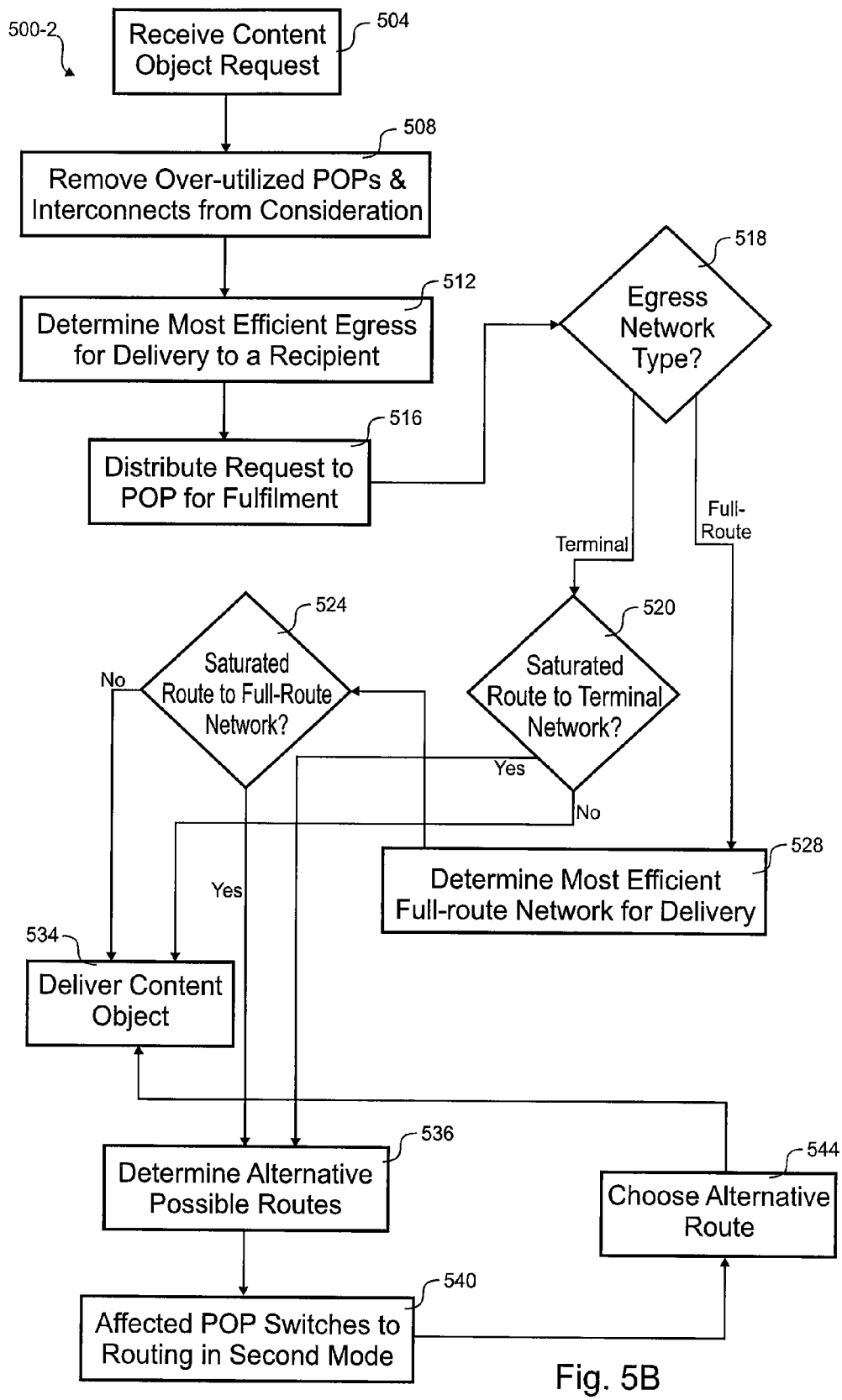

With reference to FIG. 5B, a flow diagram of another embodiment of a process 500-2 for delivering content is shown that switches between routing methods. This embodiment eliminates the link between steps 520 and 528 and does not find an efficient full-route network 222, 226 after finding the terminal network 224 is saturated. Processing goes from step 520 to step 536 when the terminal network 224 is saturated. Accordingly, where the first chosen terminal network 224 or full-route network 222, 226 is saturated, the alternatives are analyzed to find other possibilities. In one embodiment, this has the effect of distributing the traffic across many of the alternative paths.

Figure 5C:
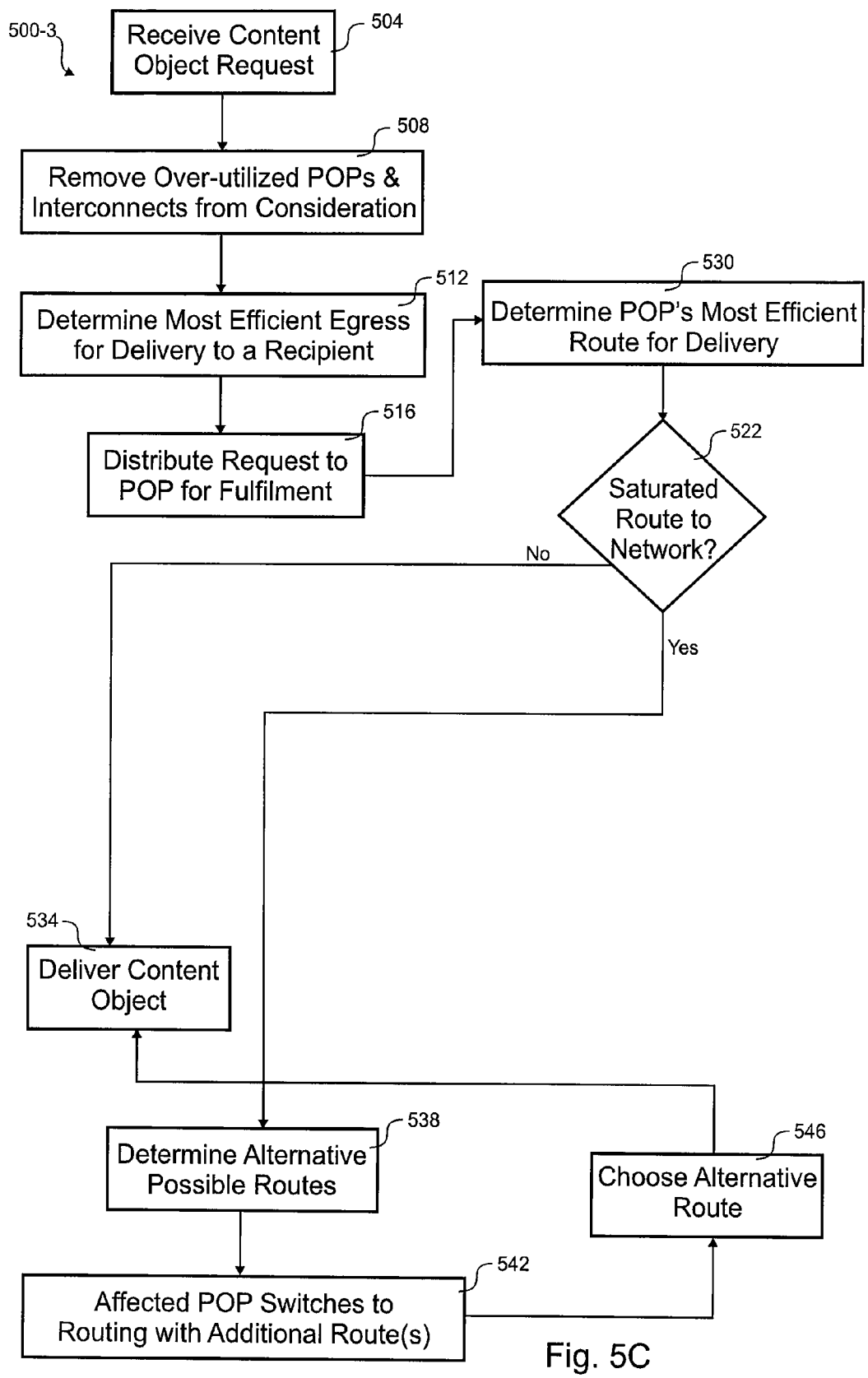

With reference to FIG. 5C, a flow diagram of yet another embodiment of a process 500-3 for delivering content is shown that switches between routing methods. This embodiment does not differ from the embodiment of FIG. 5A until after step 516. In step 530, the most efficient route is determined, which could be egress to a terminal network 224 a Tier 1 network 222 or a Tier 1 plus network 226. If the first choice is not saturated in step 522, the content object is delivered in step 534.

When the initial route is saturated, processing continues to step 538 where alternative routes are determined. The alternatives may be chosen from the present POP 304, all possible POPs 304 and/or all unsaturated POPs 304. In step 542, the affected POP switches to routing based upon factors other than efficiency. For example, the routing could be sequential or randomly disbursed among the alternatives, where the alternatives are weighted by cost, saturation level and/or efficiency. The alternative for a particular request is chosen in step 546 and delivered in step 534. In one embodiment, switching to the alternative routing would distribute excess to other routes that could deliver a piece of content.

Although the embodiments are described above in terms of saturation, switching to the alternative routing method or second mode could be done far before saturation. For example, switching could be any threshold such as 40%, 50%, 60%, 70%, or 80% utilization. Use of the term saturation is not necessarily meant to imply that performance is degraded. Indeed, performance might not be affected until 95% or more saturation in some embodiments. Switching to alternative routing at 50% utilization would serve to avoid any premature risk of degraded performance due to saturation. In any case, the saturation threshold can be set to any value in various embodiments, for example, 40%, 50%, 60%, 70%, 80%, 90%, 95%, or 100%.

Some of the above embodiments talk of the Tier 0 networks and Tier 1 plus networks routing in the first and second modes. In other embodiments, content originators could also route in two modes when there is diversity in their interconnected delivery networks. Also, terminal networks could use the two mode routing when making content object requests of interconnected networks. Indeed, any networks that have diversity in their interconnects could route in the two modes based upon a utilization determination. In one embodiment, two mode routing allows avoiding bottlenecks.

While the principles of the disclosure have been described above in connection with specific apparatuses and methods, it is to be clearly understood that this description is made only by way of example and not as limitation on the scope of the invention.

What is claimed is:

1. A delivery network for assisting delivery of content objects over an Internet, the delivery network comprising:
   a network outlet, wherein:
      the network outlet is coupled to a plurality of full-route networks comprising at least a first full-route network and a second full-route network, wherein no terminal networks are located between the network outlet and the first full-route network or between the network outlet and the second full-route network,
      each of the plurality of full-route networks is capable of delivering content objects to a plurality of terminal networks,
      the plurality of terminal networks comprise a terminal network, and
      the plurality of terminal networks are coupled to a plurality of end user computers;
   an interface that receives content objects for delivery to the plurality of end user computers; and
   a routing function that routes content objects in at least two modes, wherein:
      a first mode routes content objects based upon a first route path from the network outlet to the terminal network, the first route path is chosen based upon delivery efficiency,
a second mode routes a portion of the content objects using a second route path from the network outlet to the terminal network,
both the first route path and the second route path are used simultaneously in the second mode without regard to load balancing between the first and second route paths,
switching from the first mode to the second mode is triggered when at least of a portion a first route path reaches a predetermined level of use, wherein the predetermined level of use is below saturation,
the first route path comprises the first full-route network and the second route path comprises the second full-route network, and the first and second full-route networks are different, and
the second route path is less efficient than the first route path.

2. The delivery network for assisting delivery of content objects over the Internet as recited in claim 1, wherein:
egress from the network outlet for the second route path uses the second full-route network that is directly coupled to the terminal network, and
another full-route network is also used in the second route path to reach the terminal network.

3. The delivery network for assisting delivery of content objects over the Internet as recited in claim 1, wherein the second route path and the first route path pass through the same full-route network on the way to the terminal network.

4. The delivery network for assisting delivery of content objects over the Internet as recited in claim 1, wherein each of the plurality of full-route networks does not pass traffic to another full-route network when the full-route network is directly coupled to the terminal network that the traffic is destined for.

5. The delivery network for assisting delivery of content objects over the Internet as recited in claim 1, wherein:
the network outlet is located at a point of presence (POP), and
the POP is one of a plurality of POPs, which are geographically distributed.

6. The delivery network for assisting delivery of content objects over the Internet as recited in claim 1, further comprising a store, wherein the store caches at least one of the content objects.

7. The delivery network for assisting delivery of content objects over the Internet as recited in claim 1, wherein the content object is a whole file or a whole stream.

8. A method for delivering content objects over an Internet, the method comprising steps of:
receiving, at an interface of a network outlet, content objects for delivery to an address on the Internet, the address being associated with an end user computer coupled to a terminal network;
determining that a first egress point of the network outlet and a second egress point of the network outlet are capable of routing to the address, the first egress point is coupled with a first full-route network and the second egress point is coupled with a second full-route network, wherein no terminal networks are located between the network outlet and the first full-route network or between the network outlet and the second full-route network, and the first and second full-route networks are different;
determining that the first egress point is a more efficient route to the terminal network than the second egress point;
determining that the more efficient route is working and unsaturated, but utilized beyond a predetermined threshold; and
delivering:
a first portion of the content objects with the first egress point and
a second portion of the content objects with the second egress point while the more efficient route is utilized beyond the predetermined threshold, wherein the first and second egress points are used simultaneously without regard to load balancing between the first and second egress points.

9. The method for delivering content objects over the Internet as recited in claim 8, wherein:
after reaching the predetermined threshold, delivery of content objects is randomly distributed among a plurality of full-route networks, and
the second egress point interconnects to one of the plurality of full-route networks.

10. The method for delivering content objects over the Internet as recited in claim 8, wherein after reaching the predetermined threshold, delivery of content objects is distributed among a plurality of egress interconnects according to a sequential algorithm.

11. The method for delivering content objects over the Internet as recited in claim 8, wherein after reaching the predetermined threshold, delivery of content objects is distributed among a plurality of egress interconnects using a weighted algorithm.

12. The method for delivering content objects over the Internet as recited in claim 8, wherein:
after reaching the predetermined threshold, delivery of content objects is distributed among a plurality of egress interconnects using a weighted algorithm, and
the weighted algorithm is weighted by at least one of bandwidth cost, latency, packet loss, and maximum bandwidth.

13. The method for delivering content objects over the Internet as recited in claim 8, wherein the predetermined threshold is a percentage of a capacity of the first egress point.

14. The method for delivering content objects over the Internet as recited in claim 8, wherein the predetermined threshold is defined by a packet loss rate for the first egress point.

15. The method for delivering content objects over the Internet as recited in claim 8, wherein the first egress point has lower cost to deliver the content object than the second egress point.

16. A method for delivering content objects over an Internet, the method comprising steps of:
receiving, at an interface of a network outlet, content objects for delivery to an end user computer, wherein the end user computer is indicated by an address;
determining that the address is associated with a terminal network;
determining that a first egress point of the network outlet, a second egress point of the network outlet and a third egress point of the network outlet route to the terminal network, wherein the first egress point is coupled with a first full-route network, the second and third egress points are coupled with at least a second full-route network, no terminal networks are located between the network outlet and the first full-route network or between the network outlet and the second full-route networks, and the first and second full-route networks are different;
determining that the first egress point is a more efficient route to the terminal network;
determining that the more efficient route is unsaturated but utilized beyond a predetermined threshold; and
delivering:
a first portion of the content objects with the first egress point and
a second portion of the content objects with the second and third egress points while the efficient route is utilized beyond the predetermined threshold, wherein the first, second and third egress points are used simultaneously without regard to load balancing between the first, second and third egress points.

17. The method for delivering content objects over the Internet as recited in claim 16, wherein a route of one of the first or second egress points passes through the first full-route network of the first egress point on the way to the terminal network.

18. The method for delivering content objects over the Internet as recited in claim 16, further comprising choosing one of the second and third egress points for delivering the second portion, wherein the one is chosen without considering routing efficiency of starting delivery with the one.

19. The method for delivering content objects over the Internet as recited in claim 18, wherein the one is chosen in at least one of the following ways:
in round-robin fashion,
randomly, or
sequentially.

20. The method for delivering content objects over the Internet as recited in claim 18, wherein:
the first egress point is in a first POP, and
the one is in a second POP different from the first POP.

21. The method for delivering content objects over the Internet as recited in claim 16, wherein:
the delivering step comprises a step of delivering the content object through at least two full-route networks, and
the at least two are directly coupled to the terminal network.

22. The method for delivering content objects over the Internet as recited in claim 16, wherein:
the first egress point is in a first geographic location,
the second egress point is in a second geographic location, and
the first geographic location is different from the second geographic location.

* * * * *